(12) United States Patent
Karaoguz et al.

(10) Patent No.: US 9,107,127 B2
(45) Date of Patent: *Aug. 11, 2015

(54) COMMUNICATION SESSION SOFT HANDOVER

(71) Applicant: Broadcom Corporation, Irvine, CA (US)

(72) Inventors: Jeyhan Karaoguz, Irvine, CA (US); James Bennett, Hroznetin (CZ)

(73) Assignee: Broadcom Corporation, Irvine, CA (US)

(*) Notice: Subject to any disclaimer, the term of this patent is extended or adjusted under 35 U.S.C. 154(b) by 242 days.

This patent is subject to a terminal disclaimer.

(21) Appl. No.: 13/901,149

(22) Filed: May 23, 2013

(65) Prior Publication Data

US 2013/0250769 A1 Sep. 26, 2013

Related U.S. Application Data

(63) Continuation of application No. 12/415,749, filed on Mar. 31, 2009, now Pat. No. 8,452,290.

(51) Int. Cl.
*H04W 40/00* (2009.01)
*H04W 36/18* (2009.01)
*H04L 12/701* (2013.01)
*H04L 12/707* (2013.01)
(Continued)

(52) U.S. Cl.
CPC ............... *H04W 36/18* (2013.01); *H04L 45/00* (2013.01); *H04L 45/24* (2013.01); *H04L 45/302* (2013.01); *H04W 40/36* (2013.01)

(58) Field of Classification Search
CPC ..... H04W 36/18; H04L 45/302; H04L 45/00; H04L 45/24; H04L 40/36

USPC ............. 455/436–445; 370/328–338, 395.21, 370/401, 395.31
See application file for complete search history.

(56) References Cited

U.S. PATENT DOCUMENTS

| | | | |
|---|---|---|---|
| 6,434,134 B1 | 8/2002 | La Porta et al. | 370/338 |
| 6,587,680 B1 | 7/2003 | Ala-Laurila et al. | 455/411 |
| 6,625,135 B1 | 9/2003 | Johnson et al. | 370/332 |

(Continued)

OTHER PUBLICATIONS

Office Action issued in Chinese application No. 201010156436.1, dated Aug. 5, 2013, 5 pages.
(Continued)

*Primary Examiner* — Sharad Rampuria
(74) *Attorney, Agent, or Firm* — Brinks Gilson & Lione

(57) ABSTRACT

While receiving content for a service at a user device via a particular delivery route, detecting a request for delivery of subsequent content for the service via a secure alternate delivery route. The user device may concurrently receive delivery of the subsequent content via the particular delivery route and the secure alternate delivery route. The detected request may be generated based on QoS associated with the received content of the service. The detected request may be received from a communication network and may comprise identification information for the particular delivery route. The secure alternate delivery route may be determined based on the identification information for the particular delivery route. A communication session profile may be generated and/or determined based on the secure alternate delivery route. The communication session profile is utilized for the requested delivery of the further content via the secure alternate delivery route.

20 Claims, 6 Drawing Sheets

(51) Int. Cl.
*H04L 12/725* (2013.01)
*H04W 40/36* (2009.01)

(56) References Cited

U.S. PATENT DOCUMENTS

| | | | |
|---|---|---|---|
| 6,654,359 B1 * | 11/2003 | La Porta et al. | 370/328 |
| 6,879,574 B2 | 4/2005 | Naghian et al. | 370/338 |
| 7,433,691 B1 | 10/2008 | White | 455/445 |
| 7,460,480 B2 | 12/2008 | Awais | 370/236 |
| 7,505,770 B2 | 3/2009 | Funabiki et al. | 455/436 |
| 7,548,525 B2 | 6/2009 | Suh et al. | 370/331 |
| 8,040,809 B2 | 10/2011 | Bennett et al. | 370/238 |
| 8,045,522 B2 | 10/2011 | Wang et al. | 370/331 |
| 8,107,457 B2 | 1/2012 | White et al. | 370/350 |
| 8,121,121 B2 | 2/2012 | Xiao et al. | 370/389 |
| 8,218,512 B2 | 7/2012 | Yaqub | 370/338 |
| 8,310,935 B1 | 11/2012 | Chakravorty | 370/238 |
| 8,483,067 B2 * | 7/2013 | Bennett et al. | 370/238 |
| 8,489,101 B1 * | 7/2013 | Bestermann | 455/445 |
| 8,798,071 B2 * | 8/2014 | Palmer et al. | 370/395.21 |
| 2002/0114332 A1 | 8/2002 | Apostolopoulos et al. | 370/392 |
| 2003/0133421 A1 | 7/2003 | Sundar et al. | 370/328 |
| 2005/0226185 A1 | 10/2005 | Tell et al. | 370/331 |
| 2006/0025149 A1 | 2/2006 | Karaoguz et al. | 455/452.2 |
| 2007/0037603 A1 | 2/2007 | Dravida et al. | 455/552.1 |

OTHER PUBLICATIONS

European Search Report corresponding to European Patent Application No. 1 0002757.1-2416 dated Jul. 1, 2010.

* cited by examiner

COMMUNICATION SESSION SOFT HANDOVER

1. CROSS REFERENCE TO RELATED APPLICATIONS

This application is a continuation of application Ser. No. 12/415,749, filed Mar. 31, 2009, pending, issued as U.S. Pat. No. 8,452,290 on May 28, 2013, which is incorporated herein in its entirety by this reference.

2. TECHNICAL FIELD

Certain embodiments of the invention relate to communication systems. More specifically, certain embodiments of the invention relate to a method and system for a communication session soft handover.

3. BACKGROUND

In emerging ubiquitous network environment, the IP-based core network connects with a wide variety of wired and/or wireless access networks to provide access to end users. Such access has led to an accompanying increase in delivering a variety of services such as live video, data and audio to end users. The tendency in telecommunication industry is towards providing high-quality content for various multimedia services. Quality of Service (QoS) is designed to meet the needs for various kinds of applications and provide service quality of different kinds, such as, reducing message loss rate, decreasing message transport delay and delay jitter. To this end, QoS employs different technologies like stream categorizing, traffic monitoring, network congestion management and network congestion avoidance.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for a communication session soft handover, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION

Figure 1:
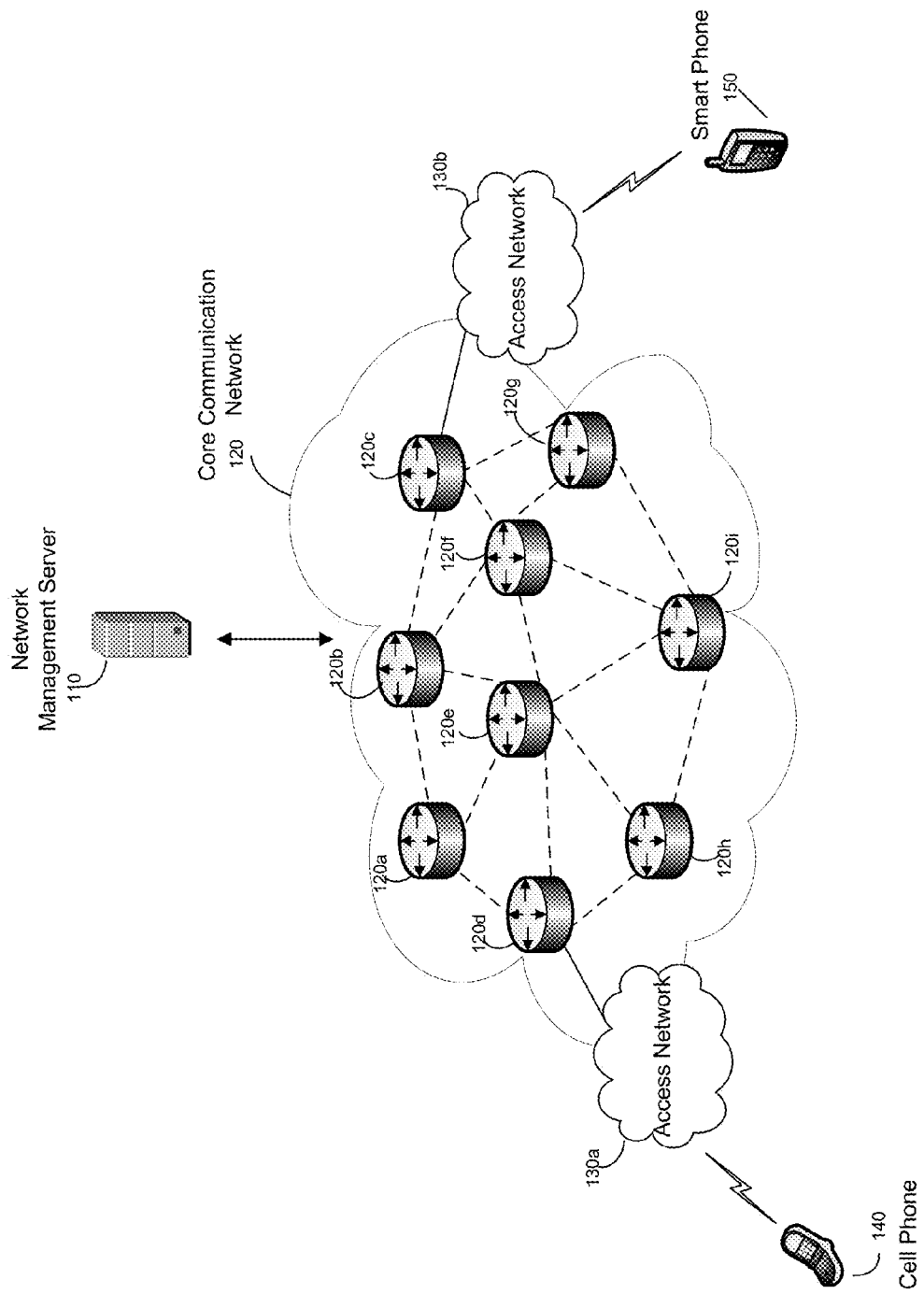
FIG. 1 is a block diagram illustrating an exemplary communication system that enables a communication session handover, in accordance with an embodiment of the invention.

Certain embodiments of the invention may be found in a method and system for a communication session soft handover. In accordance with various embodiments of the invention, a particular service is initiated and supplied between a user device and a peer user device. A degraded serving delivery route in a supporting network may cause unsatisfactory QoS performance associated with the delivery of content for a particular service. A corresponding communication system is configured to support a soft handover for the communication session to provide, for example, better satisfaction with the QoS performance associated with the delivery of the content for the particular service. In this regard, an associated user device is enabled to detect a communication session handover request for delivery of subsequent content for the particular service via one or more secure alternate delivery route. A network management server is operable to select one or more alternate or target routes to be used for the secure alternate delivery route. The associated user device receives subsequent content for the particular service via the selected alternate route. During the requested communication session handover, the associated user device receives subsequent content for the particular service over multiple communication sessions such as, for example, the serving delivery route and the selected one or more alternate routes, concurrently. The requested communication session handover completes with a release of the serving delivery route while the further content of the particular service communicates over the selected alternate route continues.

The detected communication session handover request is generated initially by the user device or by the NM server. The detected communication session handover request is triggered based on QoS performance associated with the received contents of the particular service. The detected communication session handover request comprises identification information such as a session ID associated with a current serving communication session for the particular service. The NM server identifies the session ID and determines an alternate route based on the identified session ID. A communication session profile is determined or generated for the determined alternate route. A connection secure profile is established via a secure handshaking between the NM server and the user device. The generated communication session profile as well as the established connection security profile is utilized for the delivery of the subsequent contents for the particular service over the alternate route. The subsequent contents for the particular service are delivered over the alternate route before resources associated with the current serving delivery route are released. The current serving delivery route is deactivated after starting the delivery of the further contents of the particular service over the alternate route. Moreover, the alternate route and associated connection profiles are assigned as new serving delivery route with the completion of the requested communication session soft handover.

FIG. 1 is a block diagram illustrating an exemplary communication system that enables a communication session handover, in accordance with an embodiment of the invention. Referring to FIG. 1, there is shown the system of FIG. 1 comprises a network management (NM) server 110, a core network 120 comprising a plurality of routers 120a-120i, a plurality of access networks 130a and 130b, and a plurality of clients, of which a cell phone 140 and a smart phone 150 are illustrated.

The NM server 110 comprises suitable logic, circuitry and/or code that are operable to manage various aspects of network communications such as, for example, selecting access network that a client such as the cell phone 140 uses to access the core network 120 and determining core network routes for forwarding various client packet streams toward intended recipients. The NM server 110 is configured to manage client registration and associated client locations. For example, in a mobile IP environment, the NM server 110 handles clients' available IP addresses and forwards client packet streams for each communication session using appropriate IP address notified by corresponding clients. Various client-server signaling messages such as QoS signaling messages are processed at the NM server 110a. For example, upon receiving a service request message from a client such as the Smartphone 140, the NM server 110a is operable to select a route to form a connection between the cell phone 140 and an intended peer client such as the smart phone 150.

A connection is a physical link which may be implemented via a series of routers over the selected route between the two clients. To enable communications over the connection, a session, which indicates a sequence of client-server interactions within a timeframe, is created by the NM server 110. The NM server 110 generates a unique session ID for the created session and passes to the cell phone 140 and the smart phone 150, respectively. An associated session profile of the created session comprises various session parameters such as, for example, type of service (ToS), session ID, addresses and ports, time of live. The session profile is stored at the NM server 110 for later use. Session parameters are primarily used to influence server operations. For example, the NM server 110 is operable to activate, maintain, update, and/or terminate the session per defined session parameters. The NM server 110 is configured to activate the session at the service requests of associated clients such as the cell phone 140 and/or the smart phone 150.

The NM server 110 is operable to establish a connection security profile to authenticate mutually with associated clients using a security handshaking procedure. Various security handshaking procedures may be used such as, for example, a multi-way handshaking procedure. A security handshaking procedure enables a trust relationship between the NM server 110 and associated clients. A connection security profile specifies various security capabilities such as, for example, security check mechanism, key exchange, encryption algorithm, and/or integrity algorithm that the NM server 110 and associated clients support. In this regard, the NM server 110 is configured to support a soft handover for a communication session to maintain a required QoS associated with a particular service. The NM server 110 enables both a network initiated communication session soft handover and a user initiated communication session handover. In response to a communication session soft handover request, the NM server 110 is operable to determine an alternate route for the particular service currently communicated over a serving communication session. For the determined alternate route, the NM server 110 sets up an alternate connection and establishes associated alternate communication session profile and alternate connection security profile.

During soft handover for a communication session, the NM server 110 communicates the particular service over multiple communication sessions such as, for example, the serving communication session and the established alternate communication session, concurrently. The NM server 110 delivers the particular service via the alternate communication session prior to releasing the serving communication session. The NM server 110 completes the soft handover for the communication session with a release of resources associated with the serving communication session. The NM server 110 continues the particular service via the alternate communication session.

The core network 120 comprises suitable logic, circuitry and/or code that are operable to interface various access networks such as the access network 130a-130c with external data networks such as packet data networks (PDNs) and the Internet. There are a number of routers connected through links in the core network 120. Each router such as the router 120a comprises suitable logic, circuitry and/or code that are operable to forward packet streams to intended recipients. The router 120a is configured to exchange information such as link resource information for each link with one another. The link resource information comprises information associated with the resources available and information associated with resources which have been reserved. Routers within the core network 120 are managed by the NM servers 110 in a unified way to allow easy and efficient maintenance thereof.

Various clients such as the cell phone 140 comprise suitable logic, circuitry and/or code that enable various data communications via the access network 130a and/or the core network 120. The cell phone 140 gains access to various services via the NM server 110. In an exemplary operation, it is desirable for the cell phone 140 to communicate with the smart phone 150 with specific QoS requirements. In this regard, the cell phone 140 issues a service request to the NM server 110 with the required QoS. The NM server 110 then selects a route comprising a pair of access routers such as the router 120d and the router 120c, and a series of intermediate routers such as the routers 120e-120i. The NM server 110 creates a communication session and generates an associated session ID. The NM server 110a then informs or notifies the cell phone 140 and the smart phone 150 of the generated session ID and corresponding access router addresses.

When the session is active, packet streams of the service are forwarded over the selected route towards intended recipients. In this regard, the cell phone 140 is configured to support a soft handover for the communication session to maintain QoS associated with a particular service. The cell phone 140 supports both a network initiated communication session soft handover and a user initiated communication session soft handover. For example, in the event that users of the cell phone 140 are not satisfied with received QoS experiences, the users are allowed to issue a communication session handover request for an alternate communication sessions to continue the service. The cell phone 140 is operable to implement the communication session handover request manually by a user interface and/or automatically by executing some software internally. The cell phone 140 is enabled to authenticate each other the NM server 110 via a security handshaking procedure prior to activating an alternate communication session. The cell phone 140 is operable to support various security handshaking procedures such as, for example, a multi-way handshaking procedure.

In an exemplary operation, it is desirable for the cell phone 140 to communicate with the smart phone 150 with specific QoS requirements. In this regard, the cell phone 140 issues a service request to the NM server 110 with the required QoS.

The NM server 110 then selects a route comprising a pair of access routers such as the router 120d and the router 120c, and a series of intermediate routers such as the routers 120e-120i. The NM server 110 creates a session and generates associated session ID. The NM server 110 then informs or notifies the cell phone 140 and the Smartphone 150 of the generated session ID and corresponding access router addresses. When the session is active, packet streams of the service are forwarded over the selected route towards intended recipients. In the event that, for example, the user of the cell phone 140 is not satisfied with the quality of the received service, the user of the cell phone 140 issues a communication session handover request for an alternate communication session to continue the service. In response, the NM server 110 re-evaluates the core network resources such as the current serving route assignments. In instances where the NM server 110 determines that there are no other available routes, the NM server 110 then rejects the received communication session handover request and signals the cell phone 140 of the rejection. Otherwise, the NM server 110 selects an alternate route and sets up an alternate communication session for the requested service.

The NM server 110 is operable to establish communication session profile and connection security profile for each alternate communication sessions. The established communication session profiles and connection security profiles are then applied to the established alternate communication sessions to continue the requested service prior to releasing resources associated with the current serving communication session. During the soft handover for the communication session, the NM server 110 communicates contents associated with the requested service over multiple communication sessions such as, for example, the current serving communication session and the alternate communication session, concurrently. The NM server 110 completes the soft handover for the communication session with a release of associated resources of the current serving communication session while continuing to deliver the contents associated with the requested service over the alternate communication session. The current serving communication session is updated or replaced with the alternate communication session.

Figure 2:
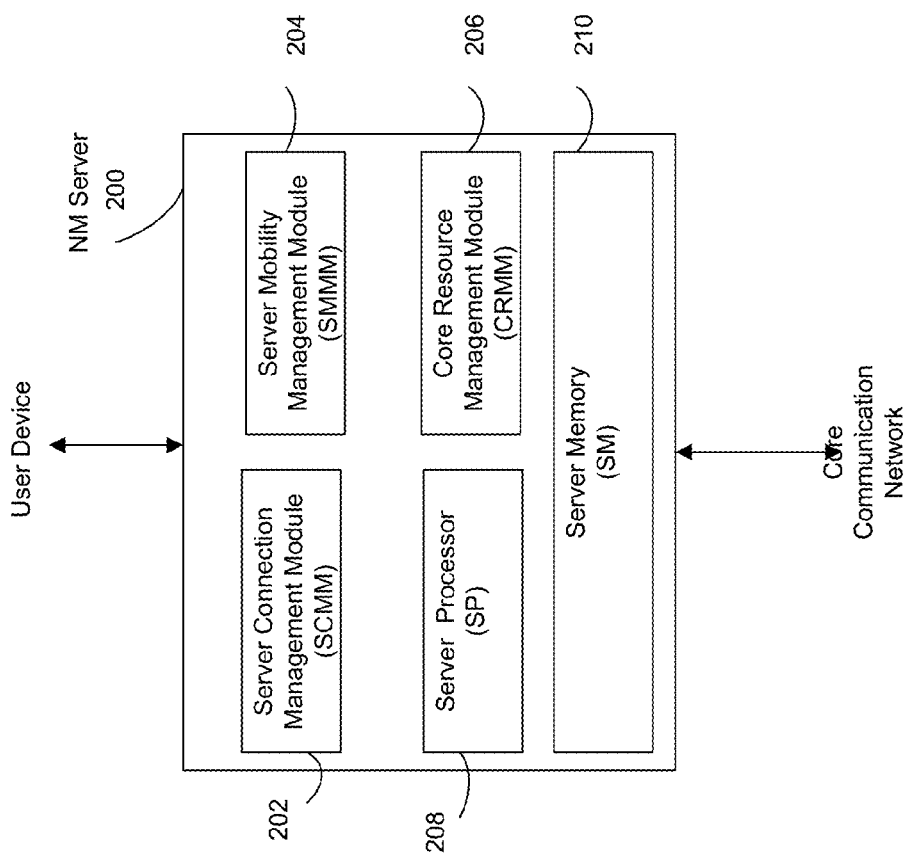
FIG. 2 is a block diagram illustrating an exemplary server device that is operable to enable a communication session handover, in accordance with an embodiment of the invention.

FIG. 2 is a block diagram illustrating an exemplary server device that is operable to enable a communication session handover, in accordance with an embodiment of the invention. Referring to FIG. 2, there is shown a NM server device 200 comprising a server connection management module (SCMM) 202, a server mobility management module (SMMM) 204, a core resource management module (CRMM) 206, a server processor (SP) 208, and a server memory (SM) 210.

The SCMM 202 comprises suitable logic, circuitry and/or code that are operable to monitor network connectivity and handle various communication session signaling messages with clients such as the cell phone 140 and the smart phone 150. The communication session signaling messages comprises various service request or QoS request messages. For example, upon the receipt of a QoS message from a client such as the cell phone 140 via the server processor (SP) 208, the SCMM 202 is configured to execute various operations related to QoS admission control and route control by coordinating with the SMMM 204 and the CRMM 210. In one exemplary embodiment of the invention, the various connection signaling messages comprises a communication session handover request from a client such as the cell phone 140, the SCMM 202 then evaluates network resource status from the CRMM 206 and selects an alternate route as an alternate route and/or access networks for requested service. The information on the selected alternate route and/or access networks is forwarded back to the SP 208 for further processing. The SCMM 202 is enabled to select the alternate route by using various algorithms stored in the SM 210. For example, an alternate route is selected by maximizing available bandwidth over the route, or by minimizing the number of routers or hops across the route. An alternate route may also be selected based on cost of the route. Since a higher cost route may guarantee higher QoS, the higher cost route may be chosen over lower cost routes to ensure higher quality QoS. The SCMM 202 is operable to maintain and release various routes within the core network 120.

The SMMM 204 comprises suitable logic, circuitry and/or code that are operable to manage mobility information such as, for example, client addresses and client locations for the system of FIG. 1. The SMMM 204 is configured to handle mobility information via various client address mappings to ensure a seamless user experience. The mobility information is provided to the SCMM 202, the CRMM 206, and the SP 208 such that packet streams for each active session are transmitted to intended recipients notified by respective clients.

The CRMM 206 comprises suitable logic, circuitry and/or code that are operable to handle route resource information according to various QoS requirements and system capabilities. In the event that a resource request from the SCMM 202 is received by the CRMM 206, the CRMM 206 evaluates resource status of the core network 120. The CRMM 202 provides core resource information, such as status of routes with available resources in the core network 120, to the SCMM 202 to be used for various route selections.

The SP 208 comprises various types of processors or circuitry such as a microprocessor, a digital signal processor, an Application Specific Integrated Circuit (ASIC), or a combination of processing type devices. In this regard, the SP 208 may comprise suitable logic circuitry and/or code that are operable to execute a plurality of software instructions, which are stored in the server memory (SM) 210 and downloaded for execution. In this regard, the SP 208 is configured to calculate session IDs for various communication sessions using various algorithms stored in the SM 210. The SP 208 is operable to enable various security handshaking procedures such as authentication and/or encryption with associated clients to ensure secure connections. The SP 208 is operable to communicate various information such as, for example, the route selection information from the SCMM 202 and connection security profile, with clients via the core network 120 and various access networks such as the access network 130a.

The SM 210 comprises suitable logic, circuitry, and/or code that are operable to enable storage of data and/or other information utilized by the NM server device 200. For example, the server memory 206 is utilized to store processed data generated by the SP 208. The SM 210 is also utilized to store information, such as client subscriber information, communication session profiles, and connection security profiles that are utilized to control various operations of the NM server device 200. The SM 210 is operable to store information necessary to enable or disable a particular service for a given user device. The server memory 206 is also operable to store some executable instructions for, for example, a communication session set-up, session profile update, and/or connection security profile update, and/or communication session re-establishment. The SM 210 comprises RAM, ROM, low latency nonvolatile memory such as flash memory and/or other suitable electronic data storage capable of storing data and instructions.

In operation, the NM server 200 receives a service request message from a client such as the cell phone 140. The service request message comprises information such as the associated QoS requirements of the requested service, candidates of access networks that the cell phone 140 uses, and an identity of an intended peer client such as the smart phone 150. The SP 208 forwards the received service request information to the SCMM 202. The connection management 202 is enabled to communicate with the peer user device such as the smart phone 150 to confirm the service request. If the smart phone 150 agrees to communicate with the cell phone 140 for the requested service, then, the SCMM 202 coordinates with the SMMM 204 to gain mobility information for the related user devices. Then the SCMM 202 communicates with the CRMM 206 to determine whether there are routes with available resources in the core network 120. The CRMM 206 then provides the core resource information to the SCMM 202. The core network resource information may comprise information regarding network nodes (routers), network node memory, and/or the links. The SCMM 202 determines a core network route and/or access networks based on the core resource information.

The SP 206 generates or determines a communication session profile and establishes a connection security profile for communicating packet streams of requested service between the cell phone 140 and the smart phone 150. The SP 206 is operable to authenticate mutually with the cell phone 140 and the smart phone 150, respectively, using a security handshaking. A session ID associated with the generated communication session profile and established connection security profile together with the selected access network information are passed to related clients. The generated communication session profile comprises various session parameters such as a session ID and type of service created. The established connection security profile comprises information such as, for example, security check mechanism, key exchange, encryption algorithm, and/or integrity algorithm that the NM server 200 and associated clients support. The generated communication session profile and established connection security profile are stored in the SM 210 to be used for later communication. In the event that the SP 208 receives a communication session handover request comprising an existing session ID stored in the SM 210, the SP 208 is operable to signal the SCMM 202 for selecting an alternate route for the corresponding service. The SCMM 202 determines the alternate route. The SP 208 generates an alternate communication session profile to set up an alternate communication session associated with the determined alternate route. The SP 208 is configured to establish an alternate connection security profile via a security handshaking between the NM server 200 and associated clients. The generated alternate session profile information and established alternate connection security profile are communicated with the associated clients. The corresponding service is activated over the alternate communication session prior to releasing resources associated with the current serving communication session. The corresponding service is communicated concurrently over the alternate communication session as well as the current serving communication session. The NM server 200 completes a soft handover for the communication session with a release of the current serving communication session. The NM server 200 continues the corresponding service over the alternate communication session.

Figure 3:
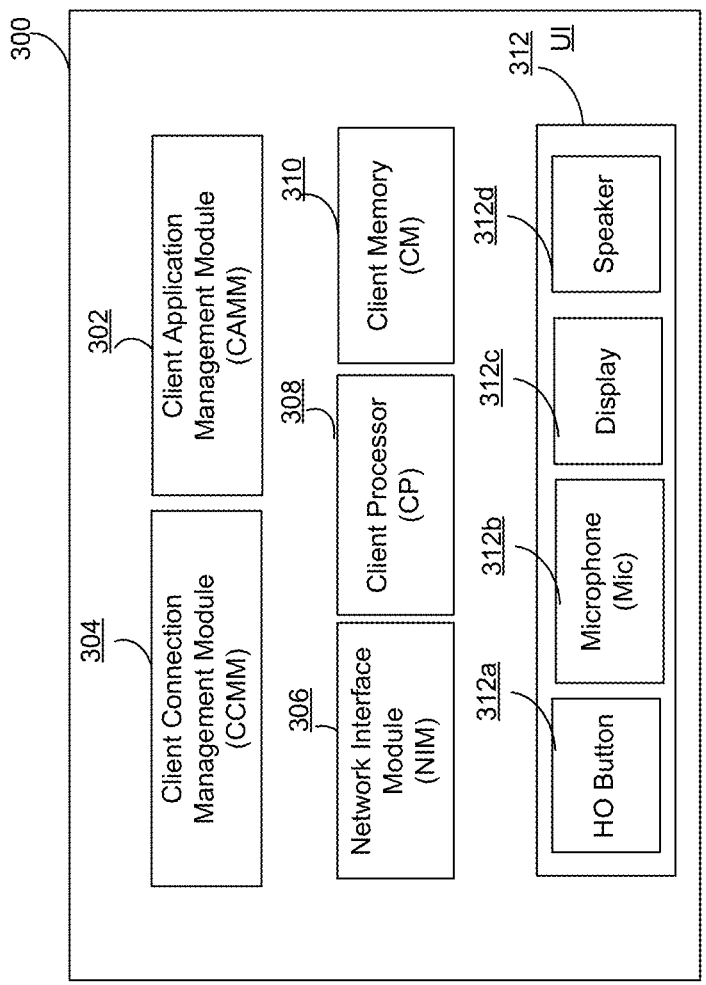
FIG. 3 is a block diagram illustrating an exemplary user device that is operable to enable a communication session handover, in accordance with an embodiment of the invention.

FIG. 3 is a block diagram illustrating an exemplary user device that is operable to enable a communication session handover, in accordance with an embodiment of the invention. Referring to FIG. 3, there is shown a user device 300 comprising a client application management module (CAMM) 302, a client connection management module (CCMM) 304, a network interface module (NIM) 306, a client processor (CP) 308, a client memory (CM) 310, and a user interface (UI) 312 comprising a handover (HO) button 312a, a microphone (Mic) 312b, a display 312c, and a speaker 312d.

The CAMM 302 comprises suitable logic, circuitry, and/or code that are operable to manage various application requirements and status. The various application requirements may comprise information regarding best user quality and QoS attributes. The application status indicates that, for example, the corresponding service is reserved and/or resumed. The CAMM 302 is also configured to monitor the fixed and variable port numbers used for identifying and monitoring application data.

The CCMM 304 comprises suitable logic, circuitry, and/or code that are operable to monitor network connectivity as well as, for example, the available bandwidth, transmission delay, and error rate of the connected access networks such as the access networks 130a-130c. The CCMM 304 is configured to handle various communication session signaling messages with the NM server 110a, for example, to access services with desired QoS, via the CP 308. The communication session signaling messages comprises various service or QoS request messages provided by the CAMM 302.

The NIM 306 comprises suitable logic, circuitry, and/or code that are operable to transmit and/or receive radio signals over an access network, which is communicatively coupled to the core network 120. The access network comprises a wired and/or wireless network. The communicated radio signals comprise information from the core network 120 which is managed via the NM server 110.

The CP 308 comprises suitable logic, circuitry, and/or code that are enabled to control and/or handle data processing operations for the user device 300. The CP 308 is operable to process signals to communicate with a supporting communication network. In this regard, the signals comprise various service signaling messages such as a QoS request message. The user device 300 is operable to signal the NM server 110 for communication session establishment and/or re-establishment which enables transferring packet streams of a particular to intended recipients over the core network 120. In this regard, the CP 306 is configured to use various mechanisms such as execution of software stored in the CM 310 to identify a communication session handover request entered via the HO button 312a and/or the microphone 312b. The CP 306 then passes the identified communication session handover request to the NM server 110 via the NIM 306. Alternatively, the CP 308 is operable to trigger a communication session handover request automatically by executing some software internally.

The CP 308 enables a security handshaking procedure to authenticate mutually with the NM server 110 prior to activating an alternate communication session during the requested communication session handover. In addition, the CP 308 starts delivering packet streams of the particular service prior to corresponding current serving communication session being deactivated. During the requested communication session handover, the CP 308 enables communicating the packet streams of the particular service over multiple communication sessions such as, for example, the current serving communication session and the alternate communication session, concurrently. The requested communication session handover completes with a release of the current serving communication session while continuing delivering packet streams of the particular service over the alternate communication session. The alternate communication session is utilized as a new serving communication session after the requested communication session handover completes to continue delivering the packet streams of the particular service.

The user interface 312 comprises suitable logic, circuitry and/or code that are operable to service the user device 300 by enabling entry of user inputs and/or presentation of various interfaces to users of the user device 300. The user interface 312 comprises the HO button 312a, the microphone (Mic) 312b, the display 312c, the speaker 312d, and/or any other type of interface that is employed by the user device 300. In the event that a user of the user device 300 is not satisfied with received QoS from the display 312c and/or the speaker 312d, the user is allowed to trigger a communication session handover request by activating the jog button 312a and/or by using voice input via the microphone 312b.

The CM 310 comprises suitable logic, circuitry, and/or code that enable storage of data and/or other information utilized by the CP 308. For example, the CM 310 is utilized to store processed data generated by the CP 308. The CM 310 is operable to store information, such as user device configuration information, that is utilized to control various operations such as user-device interaction of the user device 300. Some software and/or code stored in the CM 310 are used to translate user input operations via the HO button 312a and/or the microphone 312b into identifiable triggering events to the CP 308 for issuing communication session handover requests to the NM server 110. For example, in the event that a user of the user device 300 is not satisfied with QoS experiences obtained via the user interface 312 such as the display 312c and/or the speaker 312d, the user is provided with the capability to activate or press the HO button 312a for a new communication session with associated communication session profile and connection security profile. Associated connection security profile and communication session information such as associated access router IP addresses and session ID received from the NM server 110 are stored in the memory 310. The CM 310 is operable to store some executable instructions for running various services on the user device 300.

In an exemplary operation, in the event that the user device 300 wishes to communicate with a peer user device, the CAMM provides the CP 308 with client application requirements and/or a port number used to identify the client application data at the user device 300. Exemplary client application requirements comprise service type of the application and various QoS attributes such as bit rate and delay constrains associated with the application. The CCMM 304 is operable to communicate an identity of the peer device and IP address of a NM server such as the NM server 110a to the CP 308. The CP 308 then issues a service request to the NM server 110a via the NIM 306. The service request represents a request to initiate a communication session with the NM server 110a for a desired QoS comprising a desired data rate, latency, and error rate, with the peer device. Upon receiving a response via the NIM 306 from the NM server 110a, the CP 308 is operable to extract communication session information and associated connection security profile from the response and store in the CM 310. In instances where the received response indicates that a peer-to-peer communication session is established successfully, the CP 308 is enabled to communicate packet streams associated with the service with the associated connection security profile through the NIM 306 according to the established communication session.

The content for received service is presented to the user via the user interface 312 such as the display 312c and/or the speaker 312d, respectively. In the event that the QoS presented via the display 312c and/or the speaker 312d is not satisfactory, the user is allowed to issue a communication session handover request via activating the HO button 312a, speaking to the microphone 312b, or automatically by executing some internal software. The CP 308 identifies the communication session handover request by, for example, executing software and/or code stored in the CM 310 and forwards the communication session handover request to the NM server 110a via the NIM 306. Upon receipt of a corresponding response from the NM server 110a, the CP 308 continues service concurrently over both an alternate communication session and a current serving communication session. The communication session handover procedure is completed following a release of resources associated with the current serving communication session.

Figure 4:
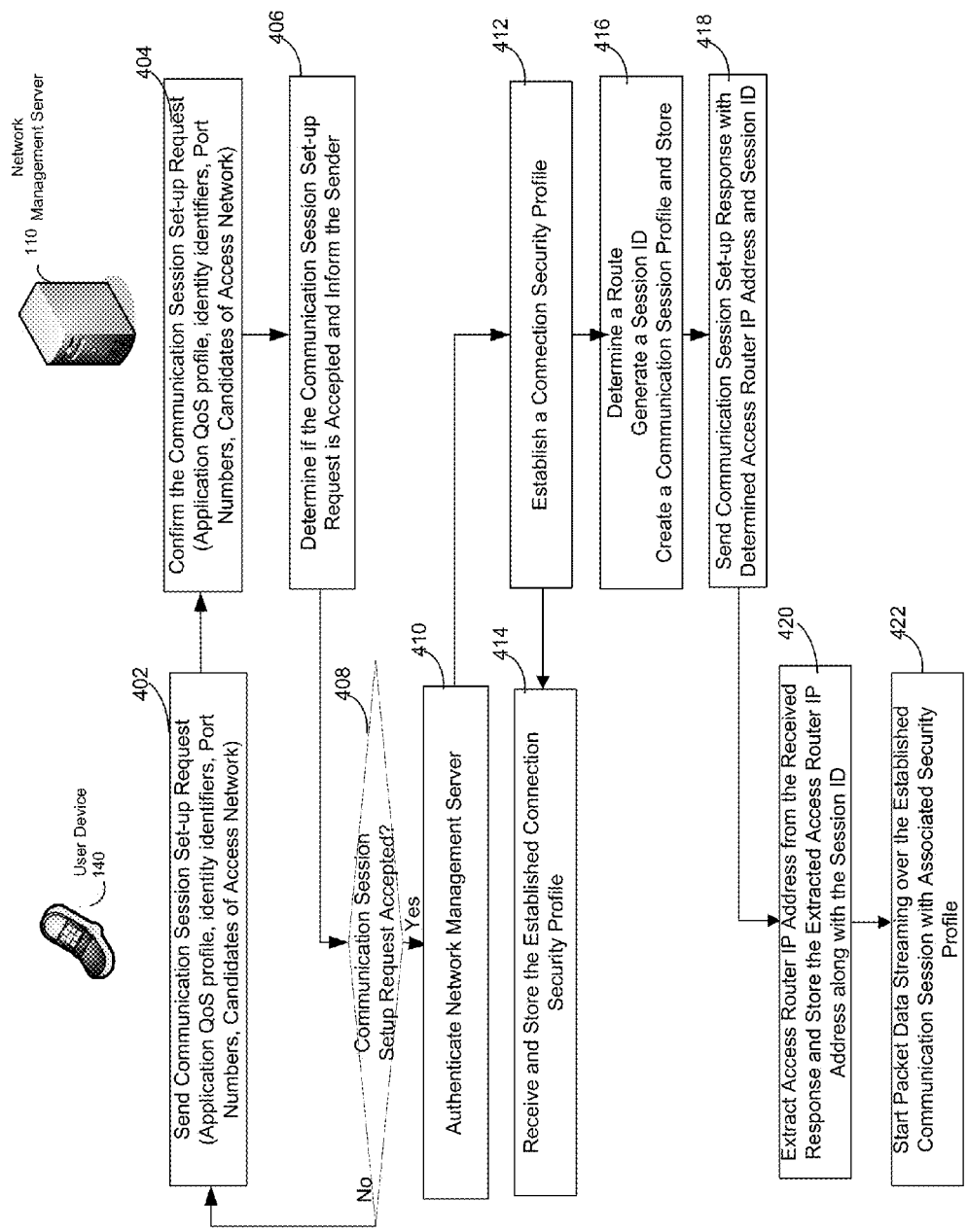
FIG. 4 is a flow chart illustrating an exemplary initial communication session set up, in accordance with an embodiment of the invention.

FIG. 4 is a flow chart illustrating an exemplary initial communication session set up, in accordance with an embodiment of the invention. Referring to FIG. 4, the exemplary steps start with the step 402, where it is desirable for a user device such as the cell phone 140 to set up a communication session with a peer user device such as the smart phone 150. The cell phone 140 sends a communication session set-up request to the NM server 110. The request comprises various information such as, for example, a client application QoS profile (client application requirements), identity identifiers such as IP address of the NM server 110, port numbers used for identifying application data, and/or candidate access networks that the cell phone 140 uses. In step 404, upon receiving the request, the NM server 110 communicates with the smart phone 150 to confirm receipt of the received request. In step 406, the NM server 110 is operable to determine whether the smart phone 150 is willing to accept the request and inform the decision to the cell phone 140. In step 408, the cell phone 140 is enabled to determine if the communication session set-up request is accepted. In instances where the communication session set-up request is accepted, then in step 410, the cell phone 140 is enabled to authenticate the NM server 110 via a security handshaking procedure with the NM server 110. In step 412, the NM server 110 establishes a connection security profile and communicates with the cell phone 140. In step 414, the cell phone 140 receives the established connection security profile and store. At the same time, in step 412, the exemplary steps continue in step 416, where the NM server 110a is operable to determine a route, generate a session ID, and create or determine a session profile. The created session profile comprises the determined route information, the generated session ID, time-of-live, type-of-service, and/or QoS profile. The created session profile is stored in the SM 210. In step 418, the NM server 110 is operable to send communication session set-up response with associated access router IP address and generated session ID. In step 420, the cell phone 140 is operable to extract the associated access router IP address and the generated session ID from the received response and store. In step 422, the requested communication session with the smart phone 150 is established. The cell phone 140 starts packet streams of a particular service over the established communication session. In step 408, in instances where the communication session set-up request is not accepted, then the exemplary steps return to step 403.

Figure 5:
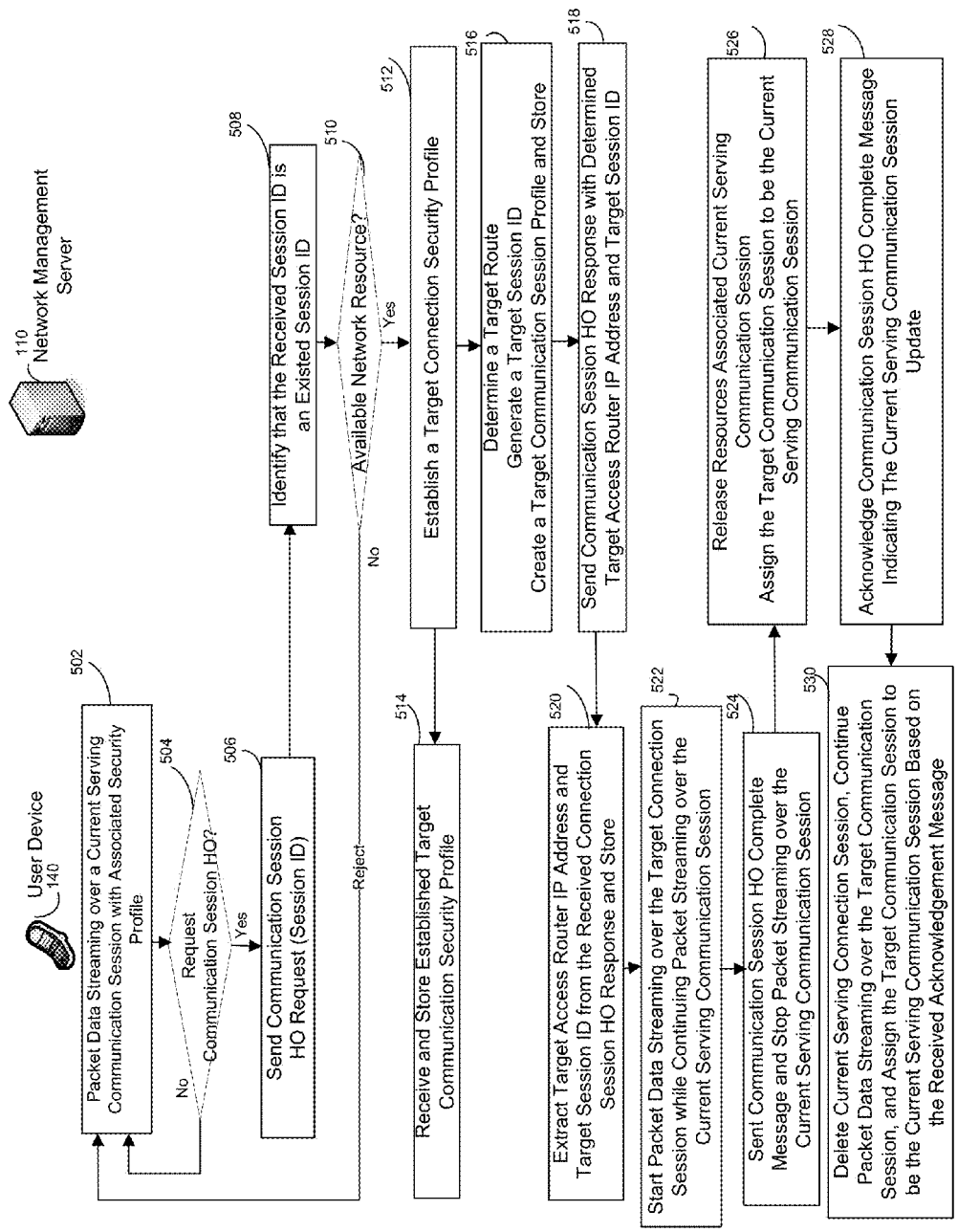
FIG. 5 is a flow chart illustrating an exemplary user initiated communication session soft handover procedure, in accordance with an embodiment of the invention.

FIG. 5 is a flow chart illustrating an exemplary user initiated communication session soft handover procedure, in accordance with an embodiment of the invention. Referring to FIG. 5, the exemplary steps start with the step 502, where the cell phone 140 is active in packet data streaming of a particular service over a current serving communication session. In step 504, the cell phone 140 is operable to determine if a communication session handover needs to be requested. In instances where the cell phone 140 determines that a communication session handover needs to be requested, then in step 506, where the cell phone 140 sends a communication session HO request comprising a session ID associated with the current serving communication session.

In step 508, the NM server 110 identifies that the received session ID is an existing session ID stored in the SM 210. In step 510, the NM server 110 determines whether the core network 120 has available resources for the received communication session HO request. In instances where network resources are available for the communication session HO request, then in step 512, the NM server 110 establishes an alternate connection security profile and communicates with the cell phone 140. In step 514, the cell phone 140 receives the established alternate connection security profile and store. Concurrently, in step 512, the exemplary steps continue in step 516, where the NM server 110 is operable to determine an alternate route, generate an alternate session ID, and create an alternate session profile. The created alternate session profile comprises the determined alternate route information, the generated alternate session ID, time-of-live, type-of-service, and/or QoS profile. The created alternate session profile is stored in the SM 210. In step 518, the NM server 110 is operable to send communication session handover response with associated alternate access router IP address and generated alternate session ID.

In step 520, the cell phone 140 is operable to extract the associated alternate access router IP address and the generated alternate session ID from the received response and store. In step 522, the requested alternate communication session is established. The cell phone 140 starts packet data streaming of the particular service over the established alternate communication session while continuing packet data streams of the particular service over the current serving communication session. In step 524, the cell phone is enabled to send a communication session HO complete message and stops packet streaming of the particular service over the current serving communication session.

In step 526, the NM server 110 releases resources associated the current serving communication session. The alternate communication session is assigned as the current serving communication session. In step 528, the NM server 110 sends an acknowledgement message to the communication session HO complete message. The acknowledgement message indicates the updates to the current serving communication session. In step 530, the cell phone 140 is enabled to delete current serving communication session and continue packet data streaming over the alternate communication session. The cell phone 140 assigns the alternate communication session to be the current serving communication session based on the received acknowledgement message.

In step 504, in instances where the cell phone 140 determines that a communication session handover does not need to be requested, then the exemplary steps return to the step 502. In step 510, in instances where network resources are not available for the communication session HO request, then the exemplary steps return to the step 502.

Figure 6:
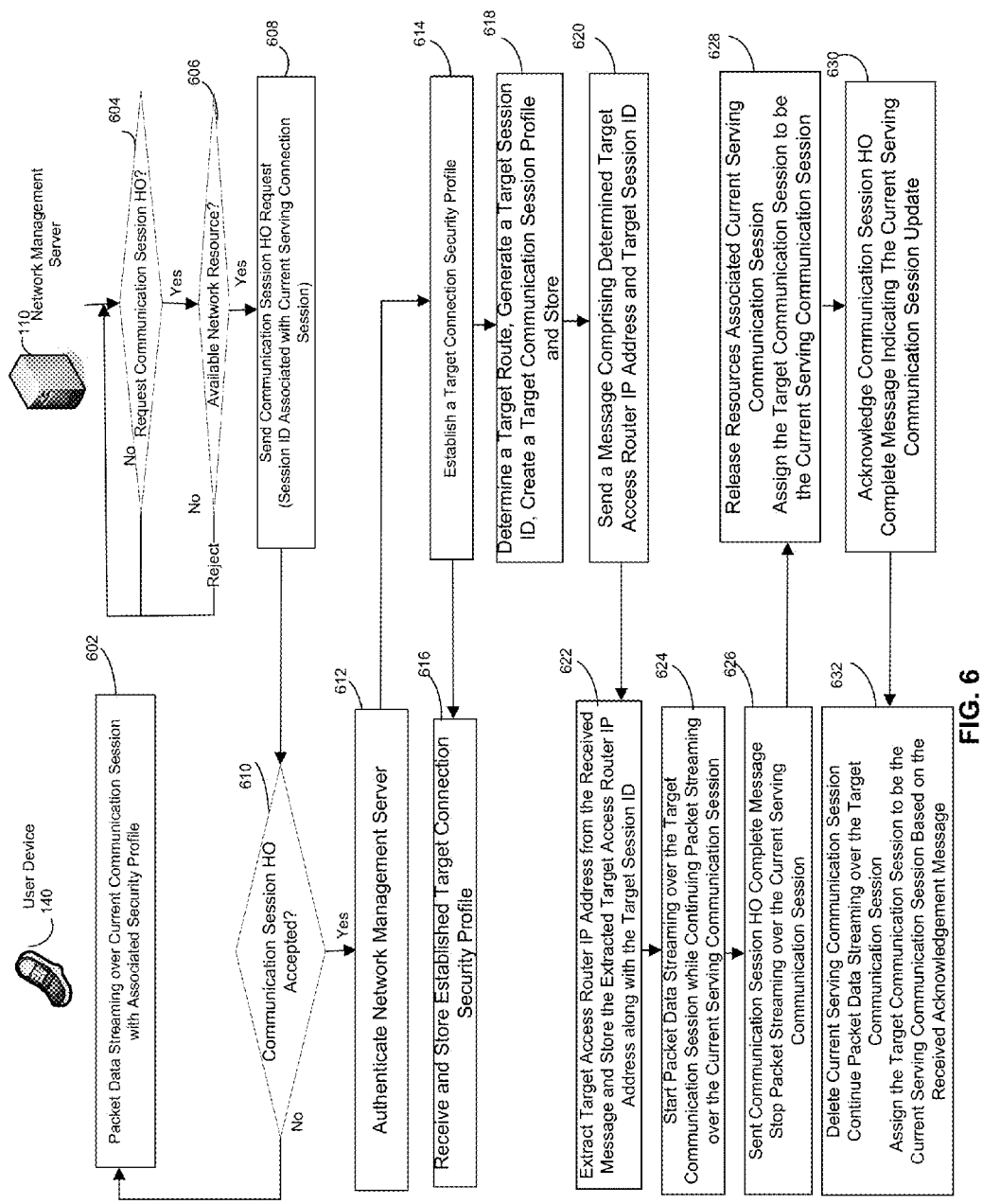
FIG. 6 is a flow chart illustrating an exemplary network initiated communication session soft handover procedure, in accordance with an embodiment of the invention.

FIG. 6 is a flow chart illustrating an exemplary network initiated communication session soft handover procedure, in accordance with an embodiment of the invention. Referring to FIG. 6, the exemplary steps start with the step 602, where the cell phone 140 is active in packet data streaming of a particular over a current serving communication session. In step 604, the NM server 110 is operable to determine if a communication session handover needs to be requested. In instances where the NM server 110 determines that a communication session handover needs to be requested, then in step 606, the NM server 110 determines whether the core network 120 has available resources for the communication session HO request. In instances where network resources are available for the communication session HO request, then in step 608, where the NM server 110 sends a communication session HO request comprising a session ID associated with the current serving communication session for packet streams of the particular service.

In step 610, the cell phone 140 is enabled to determine if the received communication session handover request is accepted. In instances where the cell phone 140 determines that the received communication session handover request is accepted, then in step 612, the cell phone 140 is enabled to authenticate NM server 110 via a security handshaking procedure with the NM server 110. In step 614, the NM server 110 establishes an alternate connection security profile and communicates with the cell phone 140. In step 616, the cell phone 140 receives the established alternate connection security profile and store. Concurrently, in step 614, the exemplary steps continue in step 618, where the NM server 110 is operable to determine an alternate route, generate an alternate session ID, and create an alternate session profile. The created alternate session profile comprises the determined alternate route information, the generated alternate session ID, time-of-live, type-of-service, and/or QoS profile. The created alternate session profile is stored in the SM 210.

In step 620, the NM server 110 is operable to send communication session handover response with associated alternate access router IP address and generated alternate session ID. In step 622, the cell phone 140 is operable to extract the associated alternate access router IP address and the generated alternate session ID from the received response and store. In step 624, the requested alternate communication session is established. The cell phone 140 starts packet data streaming of the particular service over the established alternate communication session while continuing packet data streams of the particular service over the current serving communication session. In step 626, the cell phone is enabled to send a communication session HO complete message and stops packet streaming of the particular service over the current serving communication session.

In step 628, the NM server 110 releases resources associated the current serving communication session. The alternate communication session is assigned as the current serving communication session. In step 630, the NM server 110 sends an acknowledgement message to the communication session HO complete message. The acknowledgement message indicates the updates to the current serving communication session. In step 632, the cell phone 140 is enabled to delete the current serving communication session and continue packet data streaming over the alternate communication session. The cell phone 140 assigns the alternate communication session to be the new current serving communication session based on the received acknowledgement message.

In step 604, in instances where the NM server 110 determines that a communication session handover does not need to be requested, then the exemplary steps remain in the step 604. In step 606, in instances where network resources are not available for the communication session HO request, then the exemplary steps return to the step 604. In step 610, in instances where the cell phone 140 determines that the received communication session handover request is not accepted, then the exemplary steps return to the step 602.

Aspects of a method and system for a communication session soft handover are provided. In accordance with various embodiments of the invention, a particular service is initiated and supplied between a user device such as the cell phone 140 and a peer user device such as the smart phone 150.

There may be instances when a degraded serving delivery route in a supporting network such as the core communication network 120 causes unsatisfactory QoS performance associated with the particular service. The system of FIG. 1 is configured to support a soft handover for the communication session, for example, to provide a more satisfied QoS. In this regard, associated clients such as the cell phone 140 is enabled to detect a communication session handover request for delivery of further content of the particular service via a secure alternate delivery route.

The NM server 110 is operable to select an alternate route to be used for the secure alternate route. During the requested communication session handover, the cell phone 140 receives further content of the particular service over multiple communication sessions such as, for example, the serving delivery route and the selected alternate route, concurrently. The requested communication session handover completes with a release of the serving delivery route while the further content of the particular service communicates over the selected alternate route continues. The detected communication session handover request is generated by the cell phone 140 or by the NM server 110. The detected communication session handover request is triggered based on QoS performance associated with the received contents of the particular service. The detected communication session handover request comprises identification information such as a session ID associated with a current serving communication session for the particular service, as described, for example, with respect to FIG. 5 and FIG. 6. The NM server 110 identifies the session ID and determines an alternate route based on the identified session ID. A communication session profile is determined or generated for the determined alternate route. A connection secure profile is established via a secure handshaking between the NM server 110 and associated clients such as the cell phone 140. The generated communication session profile as well as the established connection security profile is utilized for the delivery of the subsequent content of the particular service over the alternate route. The subsequent content for the particular service are delivered over the alternate route before releasing resources associated with the current serving delivery route. The current serving delivery route is deactivated after starting the delivery of the further contents of the particular service over the alternate route. Moreover, the alternate route and associated connection profiles are assigned as new serving delivery route with the completion of the requested soft handover for the communication session.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for a communication session soft handover.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method comprising:
   at a network server,
   receiving a service request for delivery of a service of subsequent content for a service over a network to a first network client device;
   in response to the service request, selecting a route through the network from a content source to a first network client device;
   creating a current communication session profile for delivery of the service;
   creating a connection security session profile for delivery of the service during the current communication session;
   generating a session identifier for the created current communication session;
   communicating the session identifier to the content source and the first network client device;
   receiving a communication session handover request for an alternate communication session to continue the service;
   selecting an alternate route through the network from the content source to the first network client device;
   creating an alternate communication session profile for an alternate communication session;
   creating an alternate connection security profile for the alternate communication session;
   while current delivery of the service continues, applying the alternate communication session profile and the alternate connection security profile to the selected alternate route through the network to continue delivery of the service through the selected alternate route; and
   subsequently, releasing resources of the current communication session.

2. The method of claim 1 wherein selecting an alternate route through the network comprises:
   selecting a route through the network that maximizes available bandwidth over the alternate route.

3. The method of claim 1 wherein selecting an alternate route through the network comprises:
   selecting a route through the network that ensures a specified quality of service (QoS) for the alternate communication session.

4. The method of claim 1 wherein receiving a service request comprises:
   receiving identity information of the first network client device; and receiving information specifying quality of service (QoS) for the delivery of the service.

5. The method of claim 4 wherein selecting an alternate route through the network comprises:
selecting a route through the network that ensures the specified QoS for the alternate communication session.

6. The method of claim 4 further comprising:
in response to the received identity information of the first network client device, obtaining mobility information for the first network client device;
and wherein selecting a route through the network comprises selecting a route using the mobility information for the first network client device.

7. The method of claim 1 wherein creating a connection security session profile comprises determining one or more of a security check mechanism and an encryption algorithm.

8. A network server comprising:
a server connection management module (SCMM) configured to evaluate network resources and select a route for communication in a network; and
a server processor (SP) in data communication with the SCMM,
the SP configured to receive a service request for delivery of subsequent content for a service over the network to a network client device, the SP configured to forward to the SCMM information of the received service request and to receive in return from the SCMM information defining an initial route through the network for delivery of the service, the SP further configured to generate an initial communication session profile and an initial connection security session profile for an initial communication session and to communicate to the network client device information about the initial communication session profile and the initial connection security session profile for the initial communication session in response to the received service request,
the SP further configured to subsequently receive a communication session handover request to transfer delivery of the subsequent content for the service and to forward to the SCMM information of the received communication session handover request and to receive from the SCMM information defining an alternate route through the network for delivery of the service, the SP further configured to generate an alternate communication session profile and an alternate connection security profile for an alternate communication session over the alternate route through the network and to communicate to the network client device information about the alternate communication session profile and the alternate profile for the alternate communication session.

9. The network server of claim 8 further comprising:
a core resource management module (CRMM) in data communication with the SCMM and configured to determine routes in the network between a content origin and a content destination.

10. The network server of claim 9 wherein the CRMM is configured to provide to the SCMM core resource information about the network including information about network nodes and network links.

11. The network server of claim 8 further comprising:
a server mobility management module in data communication with the SCMM and configured to provide to the SCMM mobility information about devices in the network including the network client device.

12. The network server of claim 8 wherein the SP is configured to activate the alternate communication session to begin providing the service over the alternate route through the network prior to releasing network resources associated with the initial communication session.

13. The network server of claim 8 wherein the SP is configured to receive identity information of the network client device and to receive information specifying quality of service (QoS) for the delivery of the service the network client device, and wherein the SCMM is configured to select a route through the network that ensures the specified QoS for the alternate communication session.

14. The network server of claim 8 wherein the SCMM is configured to select a route through the network that maximizes available bandwidth over the alternate route or that minimizes the number of routers or hops across the route.

15. A method comprising:
at a network management server,
initiating an initial communication session for provision of a particular service over a an initial route through a network between a content source and a network client device;
receiving a communication session handover request from the network client device;
in response to the communication session handover request, determining an alternate route through the network for provision of the particular service;
creating an alternate session profile identified by an alternate session identifier for an alternate communication session over the alternate route through the network for provision of the particular service;
communicating information about the alternate session profile and the alternate session identifier to the network client device;
after initiation of the alternate communication session for provision of the particular service to the network client device over the network, releasing resources associated with the initial communication session.

16. The method of claim 15 further comprising:
after releasing the resources associated with the initial communication session, sending a handover complete message to the network client device.

17. The method of claim 16 wherein sending a handover complete message comprising sending updates to a current serving communication session for updating of session information at the network client device.

18. The method of claim 15 wherein receiving a communication session handover request from the network client device comprising receiving a session identifier identifying the initial communication session, and further comprising:
at the network management server, identifying the initial communication session using the session identifier.

19. The method of claim 15 further comprising:
establishing an alternate connection security profile for use during the alternate communication session; and
communication information about the alternate connection security profile to the network client device.

20. The method of claim 15 wherein receiving a communication session handover request from the network client device comprises:
receiving information defining a desired quality of service (QoS) for the alternate communication session.

* * * * *